INVENTORS
William C. Laughlin
Abraham B. Asch
By their ATTORNEY

INVENTORS
William C. Laughlin
Abraham B. Asch
By
their ATTORNEY

Patented July 25, 1933

1,919,567

UNITED STATES PATENT OFFICE

WILLIAM C. LAUGHLIN, OF KEW GARDENS, AND ABRAHAM B. ASCH, OF BROOKLYN, NEW YORK, ASSIGNORS TO FILTRATION EQUIPMENT CORPORATION, OF NEW YORK, N. Y., A CORPORATION OF DELAWARE

FILTER BED CLEANING DEVICE FOR SEWAGE CLARIFICATION TANKS

Application filed August 4, 1931. Serial No. 555,054.

Our present invention relates to sewage clarification tanks, more particularly to tanks of the character which are furnished with filter beds for filtering out impurities; and the invention has for its purpose and object to provide an improved clarification tank embodying improved means for cleaning the filter beds therein without interfering either with the filtering operations or with the processes of sewage treatment, transpiring within the tank.

An object of the invention is to provide, in a sewage clarification tank, a novel filter bed cleaning system and arrangement whereby the solids and impurities, entrapped and enmeshed in the filter bed, will be separated from the effluent liquid. A further object is to collect the separated dirty water, solids and impurities and to draw the same out of the tank for re-circulation or for such other disposition as may be desired, while permitting the clarified effluent to rise to its discharge outlet by reason of its natural movement towards its liquid level.

For the attainment of its objects, the invention in its evolvement has in view the provision of a water-head for receiving the inflowing sewage liquid or material and the level of this water-head is at an elevation above the discharge outlet for the clarified effluent. Over the filter bed is arranged a traveling filter bed cleaning device having a collector chamber; and the filter bed and cleaning device are so relatively positioned that the inlet to the collector chamber is below the level of the discharge outlet, so that by reason of the elevation of the water-head, the liquid in the immediate territory of the cleaning device will be forced over the inlet into the collector chamber, whereas the liquid outside of the territory of the cleaning device will be forced to the elevation necessary to pass through the discharge outlet. According to a feature of the arrangement, the inlet to the collector chamber is restricted; and it is made adjustable as to height so that the level of this inlet may be varied with respect to the level of the water-head. By virtue of this provision, the pressure and velocity of the liquid upwardly through the filter bed in the territory of the cleaning device may be controlled.

It is within the province of our invention to furnish the cleaning device with means whereby to agitate or stir up the sand or magnetite composing the filter bed so that the matter enmeshed therein will be promptly released into the current which moves upwardly into the inlet to the collector chamber.

The arrangement also includes the provision of a discharge pump for pumping the dirty water and impure substances from the collector chamber as rapidly as they accumulate therein.

Another object of the invention resides in the provision of an overhead carriage or trolley which carries the sand cleaner with its means for agitating the filter bed and also the discharge pump, and the carriage is equipped with wheels which turn on guide track rails positioned along the top of the tank. The carriage may be equipped with a power unit whereby to be self-propelled on the track rails.

By means of the carriage or trolley, the sand cleaner is moved continuously along the filter bed so that the sand or magnetite composing the bed is not permitted to become sufficiently dirty to obstruct filtration. The cleaning operation may be conducted continuously along the bed and may be carried out by hydraulic means, or by mechanical means, or by magnetic means, or by various combinations of these several agencies.

Other objects and advantages of the invention will appear hereinafter.

The invention resides in the new and novel features of construction and operation and the new and original arrangements and combination of parts contained in the improved filter bed cleaning system hereinafter described and more particularly set forth in the claims.

Several simple and practical embodiments of our invention are illustrated in the accompanying drawings, in which throughout the several views like characters of reference indicate like parts, and in which:—

Figure 6:
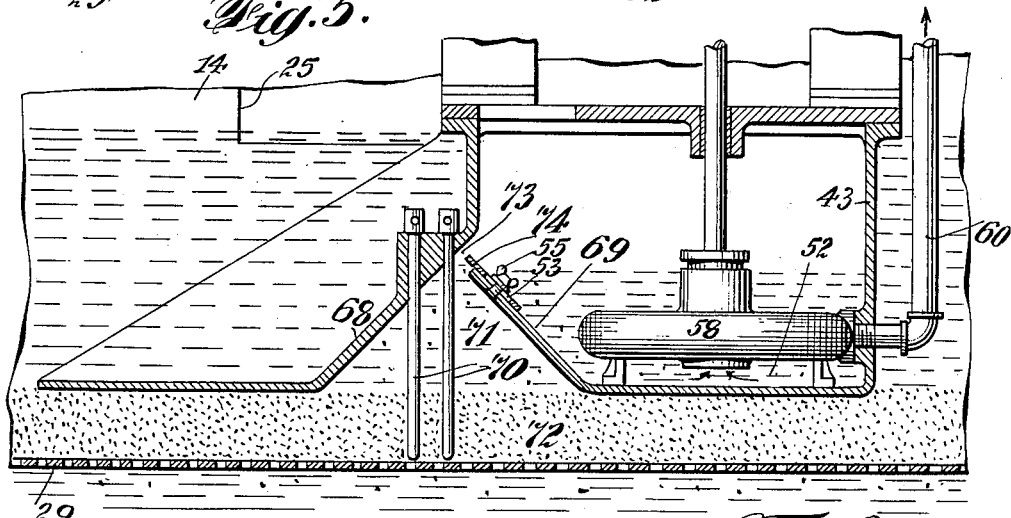
Figure 7:
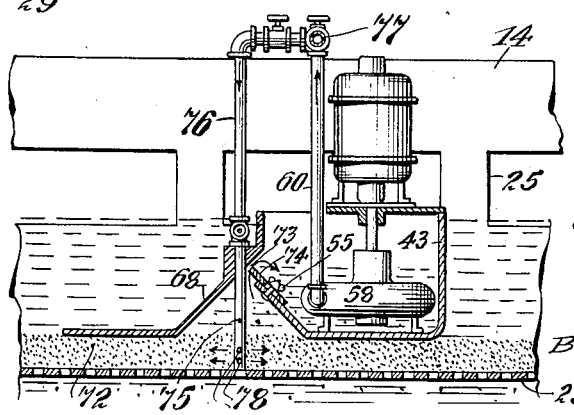

Fig. 6 is a fragmentary longitudinal sectional view, showing a modified form of construction in which the said cleaning device is equipped with pins for stirring up the sand; and Fig. 7 represents still another fragmentary longitudinal sectional view, showing an embodiment in which the sand-stirring pins are made in the form of tubes by means of which to eject liquid into the sand bed for stirring up the sand.

Figure 1:
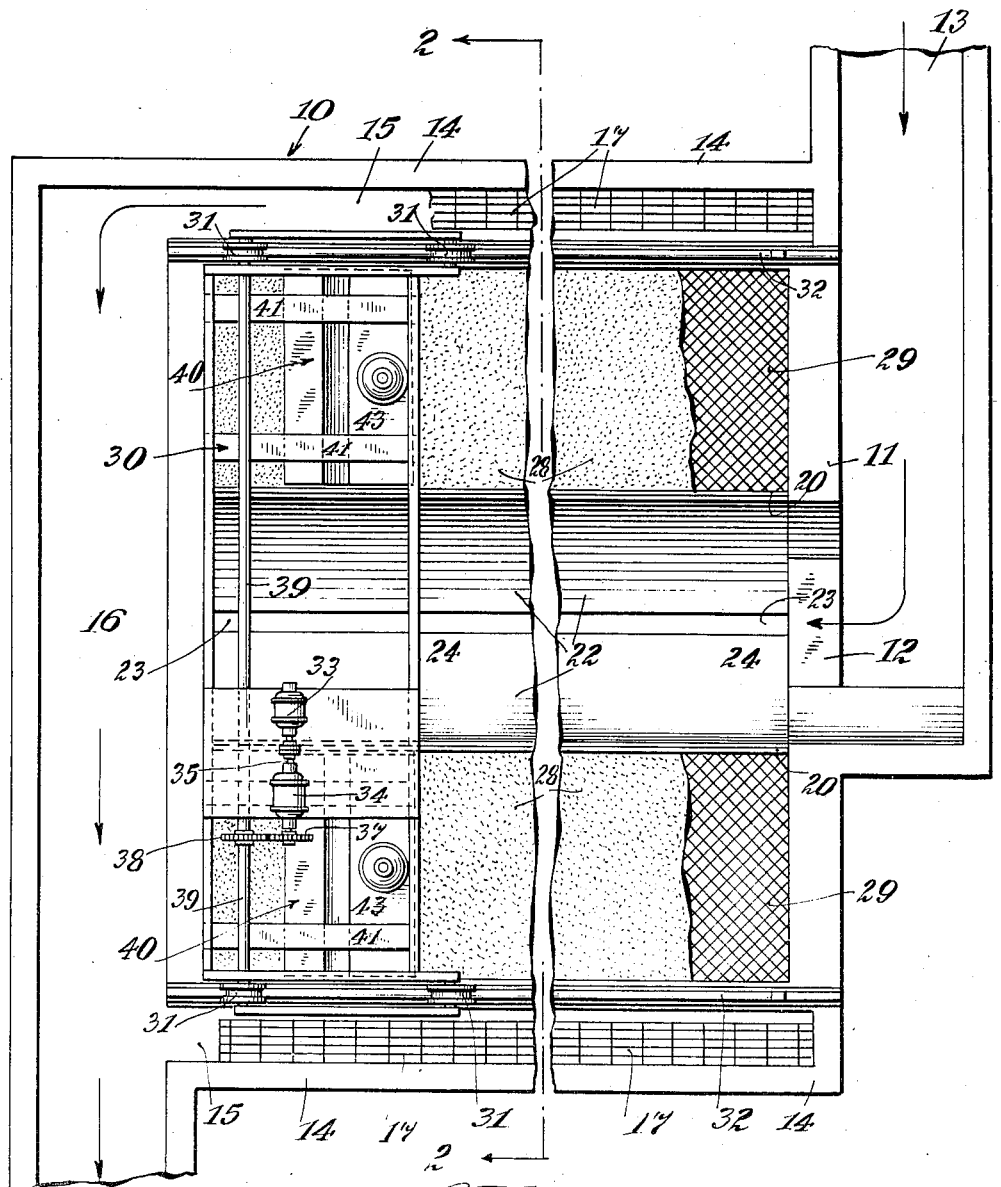
Figure 1 is a top plan view of a sewage clarification tank equipped with a cleaning apparatus made in accordance with our invention, certain parts being represented as broken away and the entire central portion of the tank itself being broken away so that only the opposite end portions of the tank appear in the view.
Figure 2:
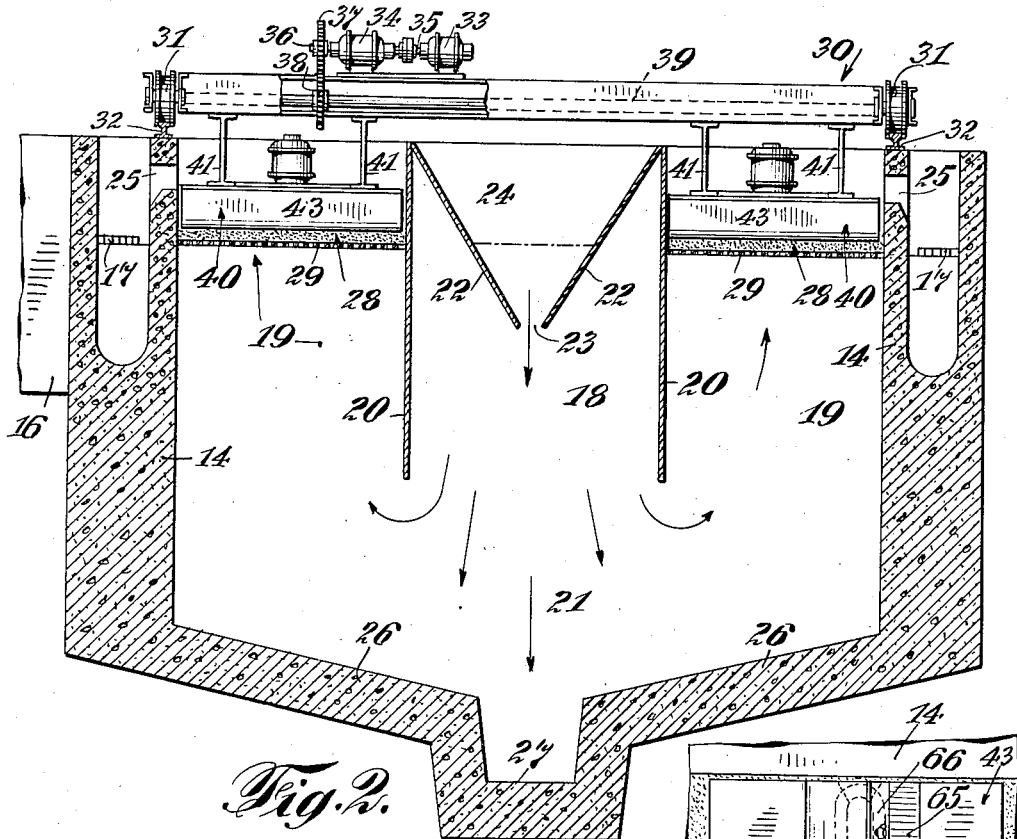
Fig. 2 is a vertical cross sectional view through the tank, taken on the line 2—2 of Fig. 1, and showing the filter bed cleaning apparatus in end elevation with parts broken away.

Referring now in detail to the accompanying drawings, 10 denotes in general an elongated sewage clarification tank, which is fractionally shown in Fig. 1 with its entire intermediate portion broken away so that only the opposite end portions of the elongated tank are illustrated. This tank may be built from concrete or any material that may be suitable or approved for the purpose. The end 11 of the tank is provided with an inlet 12 for the inflow of the sewage liquid. A suitable conduit 13 conveys the sewage liquid for passage through the inlet 12. The opposite longitudinal side walls 14, 14 of the tank are each provided with a launder or trough 15 for carrying away the effluent, and these launders or troughs empty into a main conduit 16 by which the effluent is conveyed away for disposition in any manner desired. Suitable walkways 17 for the use of workmen and attendants may be provided in the launders 15.

Internally the clarification tank may in general be constructed and arranged to carry through clarification operations in accordance with the principles more fully set forth in the application of William C. Laughlin, one of the applicants herein, Serial No. 499,195, filed December 1, 1930, for a Method of conditioning sewage. The interior of the tank is divided into a central chamber 18 and side chambers 19 by baffles 20 located in the upper portion of the tank and which terminate at their lower ends intermediate the height of the tank so as to provide in the bottom portion of the tank an open chamber 21 with which the central chamber 18 and each of the side chambers 19 can communicate. The upper portion of the chamber 18 is divided off by downwardly extending baffles 22 which converge as they extend downwardly in order to provide a restricted feed opening 23. The inlet 12 is in direct communication with the chamber 24 between the baffles 22, and the sewage fluid which fills the space 24 constitutes a water-head the level of which is elevated above the spaced outlets 25 for the discharge of the effluent into the launders 15. By reason of the water-head, a siphoning action is provided for moving the liquid upwardly through the side chambers 19 for discharge through the outlets 25. In passing, it is to be noted here that the central chamber 18, two side chambers 19, 19 and water-head chamber 24 extend lengthwise of the tank, with the central chamber 18 and water-head chamber 24 occupying positions between the side chambers 19, 19.

The inflow of sewage fluid through the inlet 12 may consist of raw sewage fluid from which all trash and grit have been removed; or it may consist of a mixture of such raw sewage fluid with water-imbibed cellulose resulting from beatings of paper in the presence of water. The mass descends from the water-head chamber through the restricted feed opening 23 into the chamber 18 and thence into the bottom chamber 21, while new supplies are fed into the water-head until the fluid mass fills the lower chamber in the tank and rises in the side chambers at the outer sides of the baffle walls 20. During the mass movement, the sewage solids, whether colloidal or suspended, are enmeshed or entangled in the cellulose gel so as to form a slime-like strata of cellulose and sewage solids. Through a coagulating medium, present in the mixture or added thereto, the colloid constituents of the mass, both the sewage solids and the colloidally conditioned fibers or cellulose gel, give up their imbibed water. Thereupon the coagulated colloids including the solids of the sewage, having a higher specific gravity than the water, settle downwardly to the bottom of the tank, while the lighter water, solids and impurities rise in the side chambers towards the discharge outlets 25. The bottom of the tank is provided with sloping portions 26 which slope toward a central channel 27. The relatively heavy matter or sludge settles onto these sloping portions and gradually moves to the channel 27 from where it is drawn off by a sludge pipe (not shown) or other suitable discharging medium.

In the upper portion of each of the side chambers 19 and below the discharge outlets 25 is provided a filter bed designated generally by the numeral 28. The water and impurities rising in the side chambers 19 by the siphoning action encounter the filter beds where the filtering out of the impurities takes place, and the clear water effluent resulting from the filtering action rises upwardly for its discharge through the outlets 25. The filter beds may consist of a bed either of sand or of magnetite ore supported upon a suitable screen 29.

The apparatus for cleaning the filter beds includes a traveling carriage which is designated in general by the numeral 30 and which may consist of any suitable framework capable of carrying the various parts which make up the complete operative apparatus for cleaning the beds. At its opposite ends, the carriage is provided with a pair of wheels 31 which turn on track rails 32 provided upon the longitudinal sides 14 and inwardly of the positions of the effluent launders 15. These track rails provide for the movement of the carriage for the full length of the filter beds so that the filtering medium can be cleaned throughout the length of the beds. The carriage is furnished with its own power means, and such means preferably consist of an electric motor 33 which is mounted upon the framework, and, in association with the motor, a reduction gear box 34 whereby from the motor shaft 35, to operate the driving shaft 36 at reduced speed. The driving shaft carries a gear 37 which is in driving engagement with a gear 38 mounted upon a shaft or axle 39. At each end of the carriage, one of the two track wheels is mounted on the shaft or axle 39. Two filter cleaning devices are provided, one for each of the filter beds 28. These cleaning devices, indicated in general by the numeral 40, are suspended from the carriage by means of suitable I-beams 41. Inasmuch as the two cleaning devices are duplicates, a detail description of one of them will suffice for the other.

Figure 5:
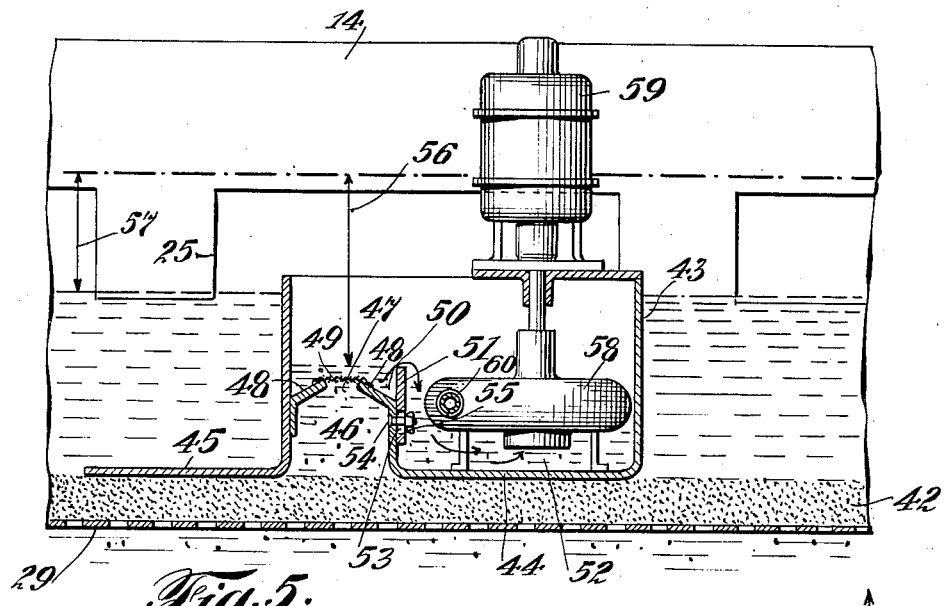
Fig. 5 is a view similar to Fig. 3, but showing a filter bed having sand as the filtering medium and showing an alternative form of the cleaner device which is capable of cleaning the sand.

In Fig. 5, we illustrate in its simplest form a cleaning device suitable for cleaning a filter bed composed of sand 42. The device includes a cleaner or cleaning tank 43 of a size to fit, transversely of the bed, between the baffle 20 and side wall 14, the fit in this regard being such that while the opposite sides of the cleaner come in close adjacency to said respective parts, yet they do not contact with said parts so as to provide frictional resistance. The bottom 44 of the cleaner is in close proximity to the top surface of the sand bed. The length of the cleaner, in the direction of the length of the sand bed, is such as will define a definite territory or area of resistance for the agitation upwardly of the sand under the pressure and velocity of the liquid rising through the sand. In the present instance the dimension of the cleaner, lengthwise of the bed, is increased by the provision of an apron or strip 45 which is in alignment with the bottom 44. This cleaner, between the bottom 44 and apron 45, and for the full dimension of the cleaner between the baffles 20 and side wall 14, is provided with a neck or inlet opening 46 in communication with a feed 47 formed by two baffles 48. A suitable screen 49 may be provided for the feed 47 between the baffles 48. Above the baffles 48 is formed a pocket area 50 which is defined along one side by a weir 51 over which water can pass to fall into the interior chamber 52 of the cleaner. The weir 51 is connected for vertical adjustment, the particular connections indicated in the present instance consisting in the provision of suitable vertically extending slots 53 through which are passed pins 54 provided with wing nuts 55. Under this construction, it will be observed that the inlet 46 is located substantially midway the length of the cleaner, so that for the territory of resistance afforded by the cleaner the dirty water and impurities will rise through the inlet 46, feed 47 and into the space 50 whence they pass over the weir into the interior chamber 52. In Fig. 5, the line 56 indicates approximately the distance between the spill over the weir and the level of the water-head; while the line 57 indicates approximately the distance between the spill through the discharge openings 25 and the level of the water-head.

Figures 3, 4:
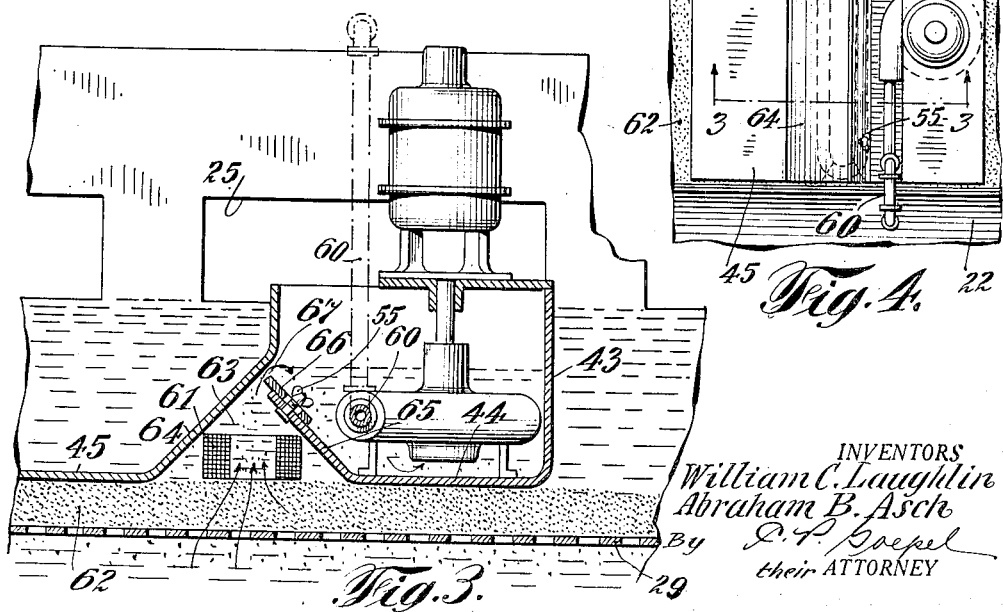
Fig. 3 represents a fragmentary longitudinal sectional view through a cleaning device having an electromagnet and through a portion of a filter bed furnished with magnetite as the filtering medium, this view being taken on the line 3—3 of Fig. 4.
Fig. 4 represents a top plan view of the parts shown in Fig. 3.

It will be apparent that by reason of the elevation of the water-head, any adjustment of the weir vertically will influence the pressure and velocity of the liquid upwardly through the filter bed for the territory occupied by the cleaner. The weir, therefore, may be adjusted in that precise position which will cause the sand between the screen 29 at the bottom of the bed and the bottom 44 and apron 45 at the top of the bed, to be churned and agitated by the pressure and velocity of the water moving under siphoning action to the inlet 46. In this way, the dirty water, solids and impurities enmeshed and entangled in the sand within the territory of the cleaner and its apron, will be released for movement with the stream into the interior chamber 52. Outside the territory occupied by the cleaner and its apron, the water rising from the sand bed where the sand has not been agitated or churned under resistance, is clean and rises under the siphoning action to the discharge outlets 25. The cleaner, it will be observed, shuts out the clean water, so that only the dirty water carrying the impurities released through the agitation and churning of the sand under pressure, will enter the chamber 52. The dirty water is removed from the chamber 52 by means of a centrifugal pump 58 operated by an electric motor 59 located upon the top of the tank where it is above the level of the flow of clean water through the discharge openings 25. The dirty water and impurities pumped out by the pump may be disposed of in any suitable manner. In Fig. 4, we show, for instance, a discharge pipe line 60 connected with the pump and arranged to discharge the dirty water and impurities into the water-head for recirculation through the clarification tank.

The carriage or trolley, carrying the two cleaning devices, moves forwardly and backwardly along the elongated tank so as to intervally clean all portions of the two sand beds from one end thereof to the other. The carriage is kept in continuous movement and the object is to clean all segments of the sand beds so frequently that there will be no opportunity for the sand to become very dirty. The cleaner the beds are kept, the cleaner the effluent will be. Owing to the provision of the water-head which induces a flow of the liquid into the dirty water chamber of each of the cleaning tanks and as well through the higher discharge outlets 25, and the fact that each cleaning tank shuts out the clear water effluent while defining a territory of resistance or agitation wherein the dirty water and impurities within the sand bed are released for movement with the stream into the dirty water chamber, there results a constant separation of the impurities from the bed so that in practice the latter is practically free of solids and impurities. By returning the separated dirty water and impurities back to the water-head, these are put into a recirculation for re-treatment within the clarification tank.

In Figs. 3 and 4, the cleaning device is illustrated as provided with an electromagnet 61 for agitating or churning a filter bed including magnetite or magnetite ore 62 as the filtering medium. The cleaning device, in this instance, is constructed so as to provide an inlet 63 of a size sufficient to contain the electromagnet which is of elongated form (Fig. 4) so as to extend substantially the entire width of the cleaning tank. The inlet 63 is defined by the upwardly converging baffles 64 and 65 formed respectively between the apron 45 and the bottom 44 of the cleaner 43. On the baffle 65 is provided an adjustable weir 66 which forms with the baffle 64 a feed opening 67 through which the dirty water and impurities pass into the chamber within the tank 43. The electromagnet is thus carried by the cleaning device so as to come above the magnetite filter bed. The magnetite within the territory of the bottom 44 and apron 45 is attracted by the magnet and therefore moves toward the magnet when the latter is energized. When the magnet is de-energized, the magnetite drops back on the screen. The magnetite is caused to jump up and fall back as often as the current is turned on and off.

The dirty water and impurities are thus released so as to be carried upwardly through the hollow core of the magnet and through the feed opening into the dirty water chamber. The magnetite, in falling back upon the screen, raps upon the screen and so aids in keeping the screen itself clean. The use of an alternating current will cause the screen itself to vibrate. This will also aid in keeping the screen clean. Attention is especially called to the fact that the weir 66 is so adjusted that the magnetite will constantly be kept on the verge of moving upwardly by reason of the pressure of the upwardly siphoned liquid. When the magnetite is thus buoyed up by the liquid pressure, little power on the part of the magnet is required in order to move the magnetite.

In the form of construction exemplified in Fig. 6, the baffles 68 and 69 are arranged in a manner similar to the baffles 64 and 65 of the construction shown in Figs. 3 and 4. In this case, instead of providing an electromagnet, we employ stirring pins 70 which are secured to the baffle 68 and which extend downwardly through the inlet 71 and into the sand of the sand bed 72. Upon the movement of the cleaning device along the top of the sand bed, the pins serve as rakes for stirring up and agitating the sand to effect the release of the dirty water and impurities which are thereupon carried up by the stream through the feed opening 73 provided between the adjustable weir 74 and the baffle 68. In the present instance, the pins 70 are stationary; but they may, if desired, be mounted for movement on eccentrics or on rocker arms so that the pins will be given an up and down or even a sidewise movement as the trolley travels along the clarification tank.

As exemplified in Fig. 7, the stirring pins may consist of tubes as 75 and they may be connected up as the terminal portions of branch discharge lines 76 which branch off from the main line 77 through which the dirty water and impurities are returned by the pump to the water-head. In this case, the pins are provided with outlet ducts 78 within the sand bed so that the dirty water expelled from the dirty water chamber by the pump can be utilized in churning up the sand in the sand bed. The pins, whether of the solid type shown in Fig. 6 or of the tubular type shown in Fig. 7, are arranged in a row or rows transversely of the cleaning device so that as the trolley progresses the sand bed will be stirred up throughout its width. In conjunction with the electromagnet shown in Figs. 3 and 4, stirring pins may be used if desired.

It is to be understood that, in practice, the several embodiments of cleaning devices may be made for use in connection with circular clarification tanks, or square clarification tanks, as well as for elongated tanks of the type herein disclosed.

It will be obvious that the several forms of construction herein disclosed are capable of embodiment in many different environments. It has been sought herein to illustrate only such embodiments as will suffice to exhibit the character of the invention.

From the foregoing description taken in connection with the accompanying drawings, it will be manifest that we have disclosed extremely simple and thoroughly satisfactory forms of cleaning devices for clarification tanks, which devices embody the features we have enumerated in the statement of the invention and as well in the foregoing description; and while we have, in the present instance, shown and described the preferred embodiments for carrying out our invention in practice, it is to be understood that the constructions exhibited are susceptible of modification in various particulars without departing from the spirit or scope of the invention or sacrificing any of its advantages.

We claim:—

1. A device for cleaning filter beds including, in combination, a separating chamber into which the dirty liquid from the bed may pass, and means for agitating a portion of the bed to translate the dirt therein into dirty liquid, said separating chamber comprising a tank for receiving the dirty liquid and having an upwardly extending inlet leading to its interior, and means for regulating the height at which the dirty liquid will pass from the inlet into the interior of the tank.

2. A device for cleaning filter beds including, in combination, a separating chamber into which the dirty liquid from the bed may pass, and means for agitating a portion of the bed to translate the dirt therein into dirty liquid, said separating chamber comprising a tank for receiving the dirty liquid and having an upwardly extending inlet leading to its interior means for regulating the height at which the dirty liquid will pass from the inlet into the interior of the tank, and means for supporting the tank for movement in juxtaposition to the surface of the bed.

3. In a sewage tank, a filter bed arranged between the walls thereof and including loose material for filtering the sewage liquid, means for causing sewage liquid to rise under pressure from below the bed upwardly through the material to a level thereabove, a carriage traveling upon the walls of the tank, a cleaning device depending from the carriage and having below the bed a liquid retaining chamber, said device including in juxtaposition to the surface of the bed a horizontally disposed barrier element which defines against the upwardly rising liquid a resistance and in which the pressure of the resisted liquid will cause agitation and washing of the material, and a passage through the barrier element leading to the liquid retaining chamber to permit the liquid with the dirt which it gathers from the material to rise under pressure for discharge into said chamber.

4. In a sewage tank, a filter bed arranged between the walls thereof and including loose material for filtering the sewage liquid, a head for causing pressural movement of the liquid from a point below the bed upwardly through the material and to a liquid level thereabove, a carriage traveling upon the walls of the tank, a cleaning device depending from the carriage and having below the liquid level above the material a liquid retaining chamber, said device including in juxtaposition to the surface of the bed a horizontally disposed barrier element which defines against the upwardly moving liquid a resistance area in which the pressural movement of the resisted liquid will cause agitation and washing of the material, and an upward passage through the barrier element in communication with the liquid retaining chamber at a point above the bottom thereof and below the liquid level above the material to permit the liquid with the dirt which it gathers from the material to rise under pressure for discharge into said chamber.

5. A cleaning device for a filter bed having loose filtering material through which liquid under pressure will move upwardly, said device comprising a tank positioned to define over the material a resistance territory wherein the pressure of the liquid will cause agitation and washing of the material so that the liquid will take up dirt from the material, said tank having a liquid containing chamber and an inlet through which the dirty liquid from the resistance territory will enter said chamber, and a weir adjustably associated with the inlet for establishing the level at which the dirty liquid will enter the chamber.

6. A cleaning device for a filter bed having loose filtering material through which liquid supplied from a head will rise under pressural movement, said device comprising a tank positioned to define over the material a resistance territory wherein the pressure of the liquid will cause agitation and washing of the material so that the liquid will take up dirt from the material, said tank having a liquid containing chamber and an inlet through which the dirty liquid from the resistance territory will enter said chamber, said chamber and inlet being below the level of the head, a weir adjustably associated with the inlet for establishing the level at which the dirty liquid will enter the chamber, said weir being adjustable with respect to the level of the head for varying through the material the pressural movement of liquid supplied by the head.

7. Means for cleaning a filter bed composed of granular material and arranged to filter liquid which is forced under a pressure head to rise upwardly through the material and to a liquid level above the bed, said means comprising a body constructed to provide resistance to the pressural tide of the liquid at the top of the bed, to establish by reason of the conflict between the pressural tide and resistance, an agitation of the material whereby to release dirt from the material, said body including a liquid-receiving chamber and an inlet to the chamber for the passage thereto of the dirty liquid which results from the agitation of the material, the discharge point of the inlet into the chamber being located at a level lower than the liquid level to insure movement of the dirty liquid through the inlet and into the chamber under the force of the pressure head, the said discharge point consisting of a weir adjustable upwardly and downwardly with respect to the liquid level for controlling movement of the tide destined to pass to said chamber.

8. In a sewage system, the combination with a filter chamber having a filter bed and a pressural upflow of liquid through the material of the bed, of a barrier obstruction moving lengthwise of said chamber in juxtaposition to the surface of the material for resisting the pressural upflow of liquid, a dirty water receiving vessel mounted upon the barrier obstruction, an upwardly extending passage through which the pressural upflow will rise to said vessel, said passage being in open communication with the surface of the material and consisting of baffle walls which rise higher than the bottom of the vessel.

9. In a sewage system comprising, with a filter chamber, a filter screen dividing the chamber into lower and upper sections, a bed of loose filtering material disposed upon the screen, said upper section having an effluent outlet at a level above the material, means for maintaining a pressural flow of sewage liquid from the lower section up through the screen and material and to the level of the effluent outlet in the upper section, a carriage traveling lengthwise of the upper section, a device movable by the carriage for cleaning the material, including a barrier in juxtaposition to the surface of the material for resisting pressural upflow of the liquid in a zone transversely of the bed, said barrier being effective to cause the resisted liquid to agitate and wash the material, a vessel combined with the barrier for receiving dirty liquid, an upwardly extending passage conducting under pressural upflow the dirty liquid from the washing operation to said vessel, said passage having within the limits of the barrier open communication with the material and extending in a zone transversely of the bed, with the delivery end of the passage in a plane below the effluent liquid level.

10. In a clarification system including a bed of sand or the like for filtering moving liquid, a tank adapted to be moved parallel to the bed and having a horizontally disposed baffle wall in juxtaposition to the surface of the bed, an inlet within the outline of the baffle wall, open to the bed to capture liquid of the bed and discharging into the interior of the tank at a point above the bottom thereof, said baffle wall being effective to resist movement of the liquid from the bed and causing agitation of the liquid and hence of the sand below such wall, and said inlet affording a passage through which the liquid of agitation may rise for discharge into the tank.

11. A sewage clarification system, comprising a filter bed arranged between side walls forming a channel above the bed, a carriage traveling upon the side walls and carrying a tank within the channel parallel to the bed, said tank being open to the atmosphere, baffle means disposed in juxtaposition to the surface of the bed and extending substantially the whole distance between the side walls to produce within the bed a backwash area for agitating and washing the bed from side wall to side wall as the tank moves along the bed, an inlet permitting dirty liquid from the backwash area to pass directly into the interior of the tank at a point above the bottom thereof, and a pump and pump line for drawing off the liquid which enters the tank, said pump being disposed within the tank and said inlet being so disposed as not to permit effective action of the pump upon the liquid on its way to the tank.

12. In a sewage system, the combination with a filter chamber having a filter bed and a pressural upflow of liquid through the material of the bed, of a barrier obstruction moving lengthwise of said chamber in juxtaposition to the surface of the material for resisting the pressural upflow of liquid, a dirty water receiving vessel mounted upon the barrier obstruction, an upwardly extending passage through which the pressural upflow will rise to said vessel, said passage being in open communication with the surface of the material and consisting of baffle walls which rise higher than the bottom of the vessel, and a screen on the baffle walls extending across said passage for eliminating any material of the bed borne by the upflow.

WILLIAM C. LAUGHLIN.
ABRAHAM B. ASCH.